(12) United States Patent
Tomago et al.

(10) Patent No.: US 10,514,460 B2
(45) Date of Patent: Dec. 24, 2019

(54) OPTICAL SENSOR AND ABNORMALITY DETECTION METHOD FOR OPTICAL SENSOR

(71) Applicant: OMRON Corporation, Kyoto (JP)

(72) Inventors: Norihiro Tomago, Ayabe (JP);
Tomonori Kondo, Fukuchiyama (JP);
Shinya Furukawa, Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/005,686

(22) Filed: Jun. 12, 2018

(65) Prior Publication Data

US 2019/0101646 A1 Apr. 4, 2019

(30) Foreign Application Priority Data

Sep. 29, 2017 (JP) ................................ 2017-190521

(51) Int. Cl.
*G01S 17/08* (2006.01)
*G01B 11/02* (2006.01)
*F21V 8/00* (2006.01)

(52) U.S. Cl.
CPC ............ *G01S 17/08* (2013.01); *G01B 11/026* (2013.01); *G02B 6/0006* (2013.01)

(58) Field of Classification Search
CPC ..... G01S 17/08; G01B 11/026; G01B 11/255; G01B 2210/50; G01J 3/0208; G01J 3/0218; G02B 6/0006
See application file for complete search history.

(56) References Cited

U.S. PATENT DOCUMENTS

| | | | | |
|---|---|---|---|---|
| 6,486,948 B1* | 11/2002 | Zeng | ................... | G01J 3/04 356/301 |
| 7,616,986 B2* | 11/2009 | Seibel | ................ | A61B 5/0062 250/227.26 |
| 8,180,422 B2* | 5/2012 | Rebec | ................ | A61B 5/14532 600/316 |
| 8,212,997 B1* | 7/2012 | Xie | ................ | G01B 11/026 356/3 |
| 9,995,624 B2* | 6/2018 | Morino | ................ | G01B 11/245 |
| 2002/0118905 A1* | 8/2002 | Wu | ................ | G01F 1/7086 385/12 |

(Continued)

FOREIGN PATENT DOCUMENTS

| | | | | |
|---|---|---|---|---|
| EP | 2500685 A1 * | 9/2012 | ........... | G01B 11/026 |
| JP | 2017-116493 | 6/2017 | | |

*Primary Examiner* — Sang H Nguyen
(74) *Attorney, Agent, or Firm* — JCIPRNET

(57) ABSTRACT

An optical sensor and an abnormality detection method therefor are provided. The optical sensor includes a light source device that generates light to be irradiated to an object; a light receiving part that receives a reflected light from the object; a branch part that fuses a first optical fiber optically coupled to the light source device and a second optical fiber optically coupled to the light receiving part to join with one end of a third optical fiber facing the object; and a processing part that determines whether junction abnormality occurs at a junction between the third optical fiber and the branch part based on whether an increment in a received light amount detected by the light receiving part with respect to a reference detection amount which is detected in a state of no reflection from the other end of the third optical fiber is within a predetermined range.

15 Claims, 11 Drawing Sheets

(56) References Cited

U.S. PATENT DOCUMENTS

| | | | |
|---|---|---|---|
| 2004/0152992 A1* | 8/2004 | Zeng | A61B 5/0071 |
| | | | 600/476 |
| 2006/0109483 A1* | 5/2006 | Marx | G01B 11/0608 |
| | | | 356/609 |
| 2010/0284025 A1* | 11/2010 | Sesko | G01B 11/0608 |
| | | | 356/609 |
| 2013/0155402 A1* | 6/2013 | Walton | G01J 3/0208 |
| | | | 356/301 |
| 2017/0122808 A1* | 5/2017 | Kuga | G01J 3/45 |
| 2018/0274903 A1* | 9/2018 | Kuga | G01B 11/0608 |

* cited by examiner

OPTICAL SENSOR AND ABNORMALITY DETECTION METHOD FOR OPTICAL SENSOR

CROSS-REFERENCE TO RELATED APPLICATION

This application claims the priority benefit of Japanese application serial no. 2017-190521, filed on Sep. 29, 2017. The entirety of the above-mentioned patent application is hereby incorporated by reference herein and made a part of this specification.

BACKGROUND

Technical Field

The disclosure relates to an optical sensor and an abnormality detection method for the optical sensor, and more particularly, to an optical sensor and an abnormality detection method for the optical sensor for measuring a distance to an object or a displacement of the object based on a reflected light from the object.

Description of Related Art

In recent years, optical sensors using confocal optical systems or the like have been widely developed. A confocal displacement meter described in Patent Document 1 (Japanese Laid-open No. 2017-116493) includes a processing device, a measurement head, a light guide part, a PC (personal computer), a main display part, and an operation part. The processing device includes a housing, a light projector, a light branch part, a light receiving part, an arithmetic processing part, a power supply part, and a secondary display part. The light guide part includes a plurality of optical fibers, a fiber coupler, and a fiber connector. The light guide part optically connects the processing device and the measurement head.

In the confocal displacement meter described in Patent Document 1, the fiber coupler of the light guide part outputs light from the light projector to the object under measurement via the measurement head and outputs reflected light from the object under measurement to the light receiving part via the light branch part. If there is abnormality in the fiber coupler, it is likely that the light from the light projector will not be propagated to the object under measurement, which makes measurement impossible. If a sensor for detecting junction abnormality of such optical fibers is provided, the cost will be increased.

SUMMARY

According to an embodiment of the disclosure, an optical sensor is provided for measuring a distance to an object or a displacement of the object based on a reflected light from the object. The optical sensor includes: a light source device for generating light to be irradiated to the object; a light receiving part for receiving the reflected light from the object; a branch part for fusing a first optical fiber optically coupled to the light source device and a second optical fiber optically coupled to the light receiving part to join with one end of a third optical fiber which faces the object; and a processing part for determining whether junction abnormality occurs at a junction between the third optical fiber and the branch part based on whether an increment in a received light amount detected by the light receiving part with respect to a reference detection amount is within a predetermined range, wherein a received light amount detected by the light receiving part in a state of no reflection from the other end of the third optical fiber is set as the reference detection amount.

According to another embodiment of the disclosure, an abnormality detection method is provided for an optical sensor that measures a distance to an object or a displacement of the object based on a reflected light from the object. The abnormality detection method includes: irradiating light generated by a light source device to the object and acquiring a received light amount detected by a light receiving part as a reference detection amount, wherein a first optical fiber optically coupled to the light source device and a second optical fiber optically coupled to the light receiving part are fused at a branch part to join with one end of a third optical fiber which faces the object, wherein the reference detection amount is a received light amount detected by the light receiving part in a state of no reflection from the other end of the third optical fiber; irradiating light generated by the light source device to the object and acquiring a received light amount detected by the light receiving part as an evaluation object detection amount; and determining whether junction abnormality at a junction between the third optical fiber and the branch part based on whether an increment in the evaluation object detection amount with respect to the reference detection amount is within a predetermined range.

DESCRIPTION OF THE EMBODIMENTS

Figure 1:
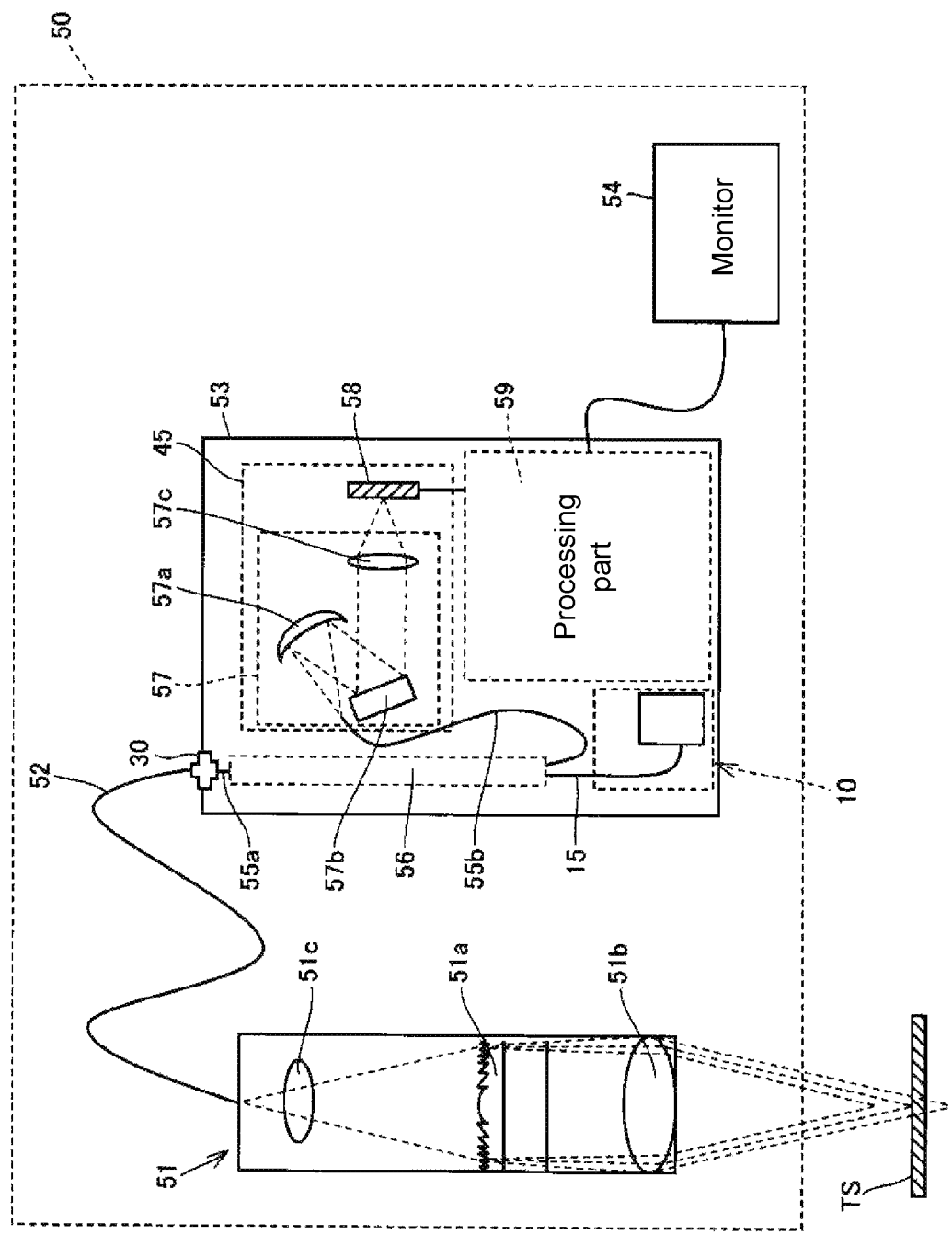
FIG. 1 is a schematic diagram showing a configuration of a confocal measurement device 50 according to an embodiment of the disclosure.

The disclosure provides an optical sensor and an abnormality detection method for the optical sensor capable of detecting junction abnormality without providing an additional detection mechanism such as a sensor.

According to an embodiment of the disclosure, the light receiving part is configured to output a wavelength characteristic of incident light intensity, and the processing part determines whether the increment is within the predetermined range based on a difference wavelength characteristic corresponding to a difference between a reference wavelength characteristic corresponding to the reference detection amount and the wavelength characteristic from the light receiving part.

According to an embodiment of the disclosure, when all of intensities at a plurality of wavelengths indicated by the difference wavelength characteristic are less than or equal to a predetermined positive first threshold value and at least one of the intensities is greater than a predetermined positive second threshold value smaller than the positive first threshold value, the processing part determines that abnormality occurs at the junction between the third optical fiber and the branch part.

According to an embodiment of the disclosure, when all of the intensities at the plurality of wavelengths indicated by the difference wavelength characteristic are less than or equal to the positive second threshold value, the processing part determines that abnormality occurs in generation of light from the light source device.

According to an embodiment of the disclosure, when all of the intensities at the plurality of wavelengths indicated by the difference wavelength characteristic are less than or equal to the positive second threshold value and at least one of the intensities is greater than an inverted negative value of the reference detection amount, the processing part determines that the light source device has deteriorated, and when all of the intensities at the plurality of wavelengths indicated by the difference wavelength characteristic are substantially equal to the inverted negative value of the reference detection amount, the processing part determines that generation of light from the light source device has stopped.

According to an embodiment of the disclosure, the processing part calculates an area value by integrating the intensities of the wavelengths indicated by the difference wavelength characteristic, and when the calculated area value is less than or equal to a predetermined positive first threshold value and is greater than a predetermined positive second threshold value smaller than the positive first threshold value, the processing part determines that abnormality occurs at the junction between the third optical fiber and the branch part.

According to an embodiment of the disclosure, when the area value is less than or equal to the positive second threshold value, the processing part determines that abnormality occurs in generation of light from the light source device.

According to an embodiment of the disclosure, when the area value is less than or equal to the positive second threshold value and is greater than zero, the processing part determines that the light source device has deteriorated, and when the area value is substantially zero, the processing part determines that generation of light from the light source device has stopped.

According to an embodiment of the disclosure, when no abnormality occurs at the junction between the third optical fiber and the branch part and no abnormality occurs in generation of light from the light source device, the processing part outputs a detection signal from the light receiving part as a valid measurement signal.

According to an embodiment of the disclosure, when determining that generation of light from the light source device has stopped, the processing part stops light projection of the light source device.

According to an embodiment of the disclosure, a notification part is further included, and when determining that abnormality occurs at the junction between the third optical fiber and the branch part or when determining that the light source device has deteriorated, the processing part notifies the abnormality through the notification part.

According to the disclosure, junction abnormality can be detected without providing an additional detection mechanism such as a sensor.

FIG. 1 is a schematic diagram showing a configuration of a confocal measurement device 50 according to an embodiment of the disclosure. The confocal measurement device 50 is an example of an optical sensor.

As shown in FIG. 1, the confocal measurement device 50 includes a light source device 10, a fiber connector 30, a light receiving part 45, a head part 51, an optical fiber 52, a branch optical fiber 56, and a processing part 59. The light receiving part 45 includes a spectroscope 57 and an imaging element 58.

The confocal measurement device 50 is a measurement device that is equipped with the light source device 10 and measures a distance to an object under measurement TS or a displacement of the object under measurement TS by using a confocal optical system. The confocal measurement device 50 measures, for example, a glass thickness, a glass flatness, etc. The light source device 10 is, for example, a white light source.

As shown in FIG. 1, the confocal measurement device 50 includes the head part 51, the optical fiber 52, a controller part 53, and a monitor 54. The head part 51 has a confocal optical system. The optical fiber 52 is connected to the head part 51. The controller part 53 is optically connected to the head part 51 via the optical fiber 52. The monitor 54 displays a signal output from the controller part 53. The optical fiber 52 and the controller part 53 are connected via the fiber connector 30. The optical fiber 52 can be attached to or detached from the fiber connector 30.

The head part 51 has a diffractive lens 51a, an objective lens 51b, and a condenser lens 51c in a cylindrical housing part. The objective lens 51b is disposed on the side of the object under measurement TS with respect to the diffractive lens 51a. The condenser lens 51c is disposed between the optical fiber 52 and the diffractive lens 51a.

The diffractive lens 51a causes chromatic aberration in light emitted from the light source device 10 along the optical axis direction, wherein the light source device 10 emits light at a plurality of wavelengths, which will be described later. Fine undulating shapes such as a kinoform shape and a binary shape (a stepped shape), for example, are periodically formed on the lens surface of the diffractive lens 51a. However, the shape of the diffractive lens 51a is not limited to the above configurations.

The objective lens 51b condenses the light with chromatic aberration caused by the diffractive lens 51a to the object under measurement TS.

The condenser lens 51c is disposed between the optical fiber 52 and the diffractive lens 51a so that a numerical aperture (NA) of the optical fiber 52 coincides with a numerical aperture of the diffractive lens 51a. With the numerical aperture of the optical fiber 52 coinciding with the numerical aperture of the diffractive lens 51a, the light emitted from the optical fiber 52 can effectively utilized in the diffractive lens 51a. The light emitted from the light source device 10 as a white light source is guided to the head part 51 via the optical fiber 52.

The optical fiber 52 is an optical path from the head part 51 to the controller part 53 and also functions as a pinhole. That is, among the light condensed by the objective lens 51b, the light focused on the object under measurement TS is focused at an opening of the optical fiber 52. Therefore, the optical fiber 52 functions as a pinhole that shields off light at wavelengths not focused on the object under measurement TS and allows light focused on the object under measurement TS to pass.

The confocal measurement device 50 may also be configured without using the optical fiber 52 as the optical path from the head part 51 to the controller part 53. However, by using the optical fiber 52 as the optical path, it is possible to move the head part 51 flexibly with respect to the controller part 53. Also, in the configuration in which the optical fiber 52 is not used as the optical path from the head part 51 to the controller part 53, the confocal measurement device 50 needs to have a pinhole. However, in the configuration with the optical fiber 52, the confocal measurement device 50 does not need to have a pinhole.

The controller part 53 incorporates therein the light source device 10 as a white light source, the branch optical fiber 56, the spectroscope 57, the imaging element 58, and the processing part 59. The configuration of the light source device 10 will be described later in detail.

The branch optical fiber 56 includes one optical fiber 55a on the side connected to the optical fiber 52, which forms the optical path from the head part 51 to the controller part 53, and two optical fibers 15 and 55b on the opposite side. The optical fiber 15 constitutes a part of the light source device 10, which will be described later. The optical fiber 55b is connected to the spectroscope 57 and emits the light from the optical fiber 55a to the spectroscope 57.

The branch optical fiber 56 is combined with the fiber connector 30 to form a branch part. In addition to the combination of the branch optical fiber 56 and the fiber connector 30, a beam splitter or a half mirror, for example, may also be used as the branch part.

With the above configuration, the branch optical fiber 56 guides the light emitted from the light source device 10 to the optical fiber 52, and the light is then irradiated on the object under measurement TS from the head part 51. Further, the branch optical fiber 56 guides the light reflected on the surface of the object under measurement TS to the spectroscope 57 via the optical fiber 52 and the head part 51.

The spectroscope 57 includes a concave mirror 57a, a diffractive grating 57b, and a condenser lens 57c. The concave mirror 57a reflects the reflected light returning via the head part 51. The light reflected by the concave mirror 57a is incident on the diffractive grating 57b. The condenser lens 57c condenses the light emitted from the diffractive grating 57b. The spectroscope 57 may be of any configuration, such as a Czerny-Turner type or a Littrow type, if the reflected light returning via the head part 51 can be divided at each wavelength.

The imaging element 58 is a line CMOS (complementary metal oxide semiconductor) or CCD (charge coupled device) that measures the intensity of the light emitted from the spectroscope 57. In the confocal measurement device 50, the spectroscope 57 and the imaging element 58 constitute a measurement part that measures the intensity of the reflected light returning via the head part 51 at each wavelength.

The measurement part may be composed of a single imaging element 58 such as a CCD if the measurement part can measure the intensity of the light returning via the head part 51 at each wavelength. Further, the imaging element 58 may be a two-dimensional CMOS or a two-dimensional CCD.

The processing part 59 controls operations of the light source device 10, the imaging element 58, etc. Although not shown, the processing part 59 includes an input interface for inputting signals for adjusting the operations of the light source device 10, the imaging element 58, etc., and an output interface for outputting signals of the imaging element 58. When receiving a light receiving signal from the imaging element 58, the processing part 59 measures the distance to the object under measurement TS or the displacement of the object under measurement TS and detects abnormality in a light projector based on the light receiving signal.

The monitor 54 displays the signal output by the imaging element 58. For example, the monitor 54 presents a spectral waveform of the light returning from the head part 51 to the imaging element 58 via the optical fiber 52 and the spectroscope 57, and displays the distance to the object under measurement TS or the displacement of the object under measurement TS.

(About Abnormality Detection in the Light Projector)

Next, a method for detecting abnormality in a light projector including the light source device 10 will be described.

Figure 2:
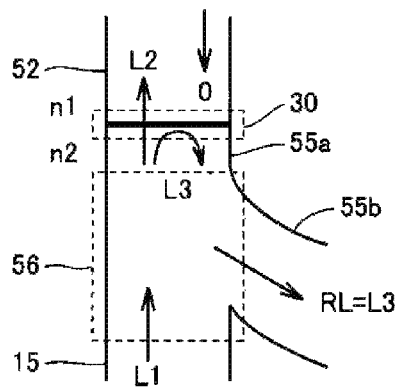
FIG. 2 is a schematic diagram showing a configuration around a fiber connector 30 at the time of calibration in the confocal measurement device 50 of FIG. 1.

FIG. 2 is a schematic diagram showing a configuration around the fiber connector 30 at the time of calibration in the confocal measurement device 50 of FIG. 1.

Referring to FIG. 2, the fiber connector 30 optically connects the optical fiber 52 outside the controller part 53 and the optical fiber 55a inside the controller part 53. The fiber connector 30 transmits light by bringing the optical fiber 52 having a refractive index n1 and the optical fiber 55a having a refractive index n2, which is substantially equal to the refractive index n1, into close contact with each other. However, a slight reflected component associated with the emitted light from the light source device 10 is generated at the end face portion where the optical fiber 52 and the optical fiber 55*a* are in close contact.

FIG. 2 shows calibration at the time when no object under measurement TS is provided and no light is reflected back to the fiber connector 30 via the optical fiber 52. Light L1 emitted from the light source device 10 via the optical fiber 15 is mostly output as light L2 to the optical fiber 52, but a portion of the light L1 is reflected by the fiber connector 30 as light L3. In FIG. 2, since the reflected light from the object under measurement TS is zero, the light L3 directly becomes the light output to the optical fiber 55*b* via the branch optical fiber 56. The light L3 is referred to as return light RL of the light source device 10.

Figure 3:
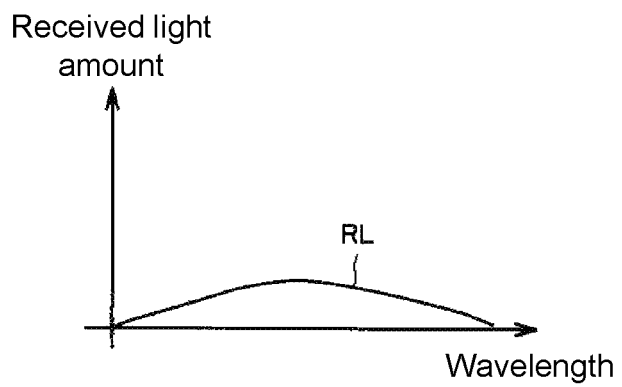
FIG. 3 is a diagram showing a received light amount of return light RL at each wavelength at the fiber connector 30.

FIG. 3 is a diagram showing a received light amount of the return light RL at each wavelength at the fiber connector 30. Referring to FIG. 3, the return light RL is an offset component coming in regardless of the presence of the object under measurement TS. The return light RL may affect linearity performance during measurement. The offset component has a machine difference depending on the optical fiber to be connected. Therefore, it is necessary to correct the machine difference by calibrating the head part 51.

Figure 4:
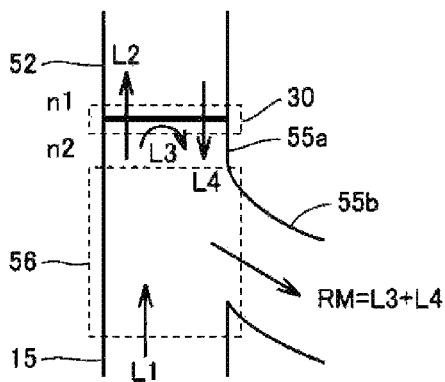
FIG. 4 is a schematic diagram showing the configuration around the fiber connector 30 at the time of measurement in the confocal measurement device 50 of FIG. 1.

FIG. 4 is a schematic diagram showing the configuration around the fiber connector 30 at the time of measurement in the confocal measurement device 50 of FIG. 1.

Referring to FIG. 4, when the object under measurement TS is measured, the light L1 emitted from the light source device 10 via the optical fiber 15 is mostly output as the light L2 to the optical fiber 52, while a portion of the light L1 is reflected by the fiber connector 30 as the light L3. The light L2 is reflected by the object under measurement TS, and reflected light L4 returns to the fiber connector 30. The sum of the light L3 and the light L4 is output from the optical fiber 55*b* as a light receiving signal RM.

Figure 5:
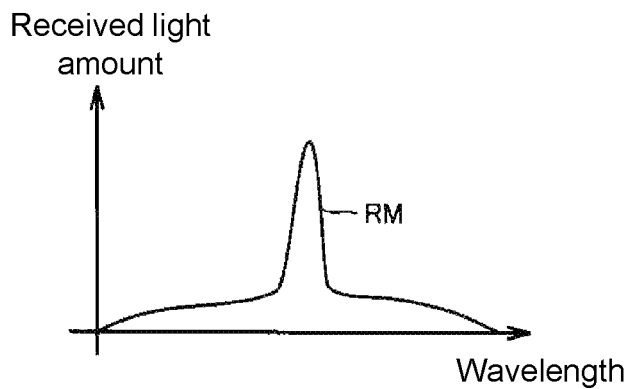
FIG. 5 is a diagram showing the received light amount with respect to the wavelength at the time of measurement of an object under measurement TS.

FIG. 5 is a diagram showing the received light amount with respect to the wavelength at the time of measurement of the object under measurement TS. As shown in FIG. 5, the light receiving signal RM is distributed around the wavelength of the light focused on the object under measurement TS. As described above, the light receiving signal RM contains the component of the return light RL regardless of the presence of the object under measurement TS.

Figure 6:
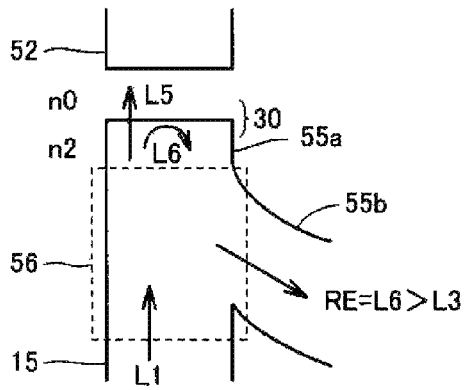
FIG. 6 is a schematic diagram showing the configuration around the fiber connector 30 at the time of fiber fallout in the confocal measurement device 50 of FIG. 1.

FIG. 6 is a schematic diagram showing the configuration around the fiber connector 30 at the time of fiber fallout in the confocal measurement device 50 of FIG. 1.

FIG. 6 shows a case where the optical fiber 52 falls out from the fiber connector 30. In this case, the optical fiber 55*a*, which has the refractive index n2, is in contact with the air, which has a refractive index n0, at the end face. The difference in refractive index between the refractive index n2 and the refractive index n0 is greater than the difference in refractive index between the refractive index n2 and the refractive index n1. Therefore, a greater reflected component is generated on the end face of the optical fiber 55*a* than when the optical fiber 52 and the optical fiber 55*a* are in close contact with each other.

Referring to FIG. 6, a portion of the light L1 emitted from the light source device 10 via the optical fiber 15 is released as light L5 into the air, and the other portion is reflected as light L6 by the fiber connector 30. In FIG. 6, since the light L5 does not re-enter the optical fiber 55*a*, the light L6 directly becomes the light output to the optical fiber 55*b* via the branch optical fiber 56 as a light receiving signal RE. The light receiving signal RE becomes greater than the return light RL due to the difference in refractive index.

Figure 7:
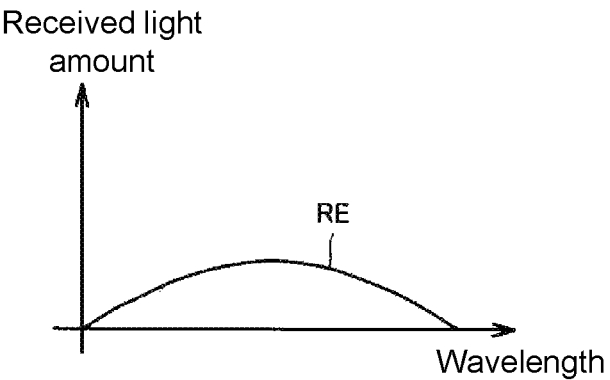
FIG. 7 is a diagram showing the received light amount with respect to the wavelength in a case where an optical fiber 52 falls out from the fiber connector 30.

FIG. 7 is a diagram showing the received light amount with respect to the wavelength in a case where the optical fiber 52 falls out from the fiber connector 30.

As shown in FIG. 7, the light receiving signal RE has a greater return light compared to a state where the optical fiber 52 is in place without falling out, because as the optical fiber 52 is replaced with air, the difference in refractive index is increased. Similar to the return light RL, the light receiving signal RE is not affected by the object under measurement TS, either.

Figure 8:
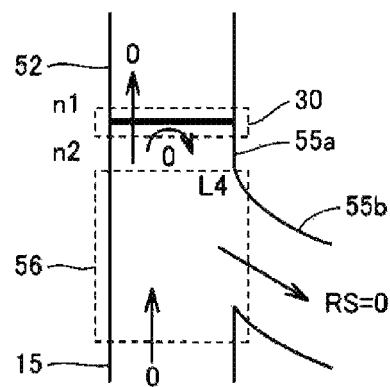
FIG. 8 is a schematic diagram showing an example of the configuration around the fiber connector 30 at the time of abnormality in the light source device 10 in the confocal measurement device 50 of FIG. 1.

FIG. 8 is a schematic diagram showing an example of the configuration around the fiber connector 30 at the time of abnormality in the light source device 10 in the confocal measurement device 50 of FIG. 1.

When the light source device 10 is abnormal, the light emitted from the light source device 10 via the optical fiber 15 is reduced. Therefore, the light transmitted via the fiber connector 30 and the light reflected are both below a predetermined value. As a result, a light receiving signal RS output to the optical fiber 55*b* via the branch optical fiber 56 also falls below the predetermined value. FIG. 8 shows a case where the light source device 10 is stopped due to abnormality in the light source device 10.

Figure 9:
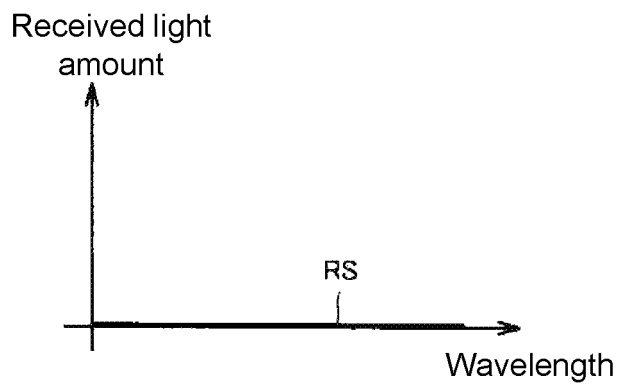
FIG. 9 is a diagram showing an example of the received light amount with respect to the wavelength in a case where abnormality occurs in light projection of the light source device 10.

FIG. 9 is a diagram showing an example of the received light amount with respect to the wavelength in a case where abnormality occurs in light projection of the light source device 10.

As shown in FIG. 9, the light receiving signal RS becomes almost zero when abnormality occurs in light projection of the light source device 10 and the light source device 10 is stopped. In addition to the case where the light source device 10 is stopped, the abnormality in light projection also includes a case where a translucent fluorescent body or the like inside the light source device 10 is damaged and the light reaching the imaging element 58 becomes zero, and a case where the light reaching the imaging element 58 falls below a predetermined threshold value as the light source device 10 deteriorates.

Figure 10:
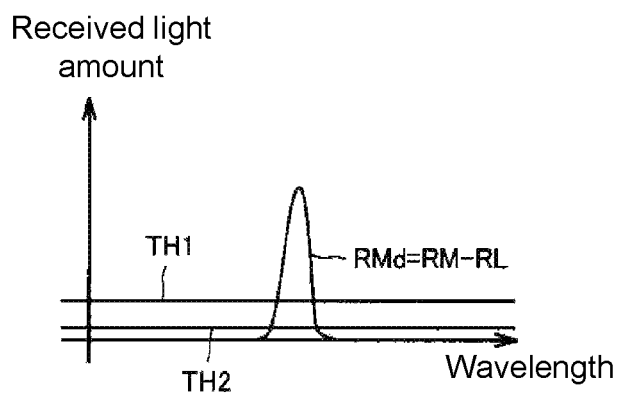
FIG. 10 is a diagram of correction made by subtracting the return light RL from a light receiving signal RM at the time of measurement of the object under measurement TS.

FIG. 10 is a diagram of correction made by subtracting the return light RL from the light receiving signal RM at the time of measurement of the object under measurement TS.

A corrected signal RMd is obtained by subtracting the return light RL at the normal time, from which the influence of the exposure time is eliminated, from the light receiving signal RM at the time of measurement of the object under measurement TS. As shown in FIG. 10, the corrected signal RMd has a value greater than threshold values TH1 and TH2 around the wavelength of the light focused on the object under measurement TS.

Figure 11:
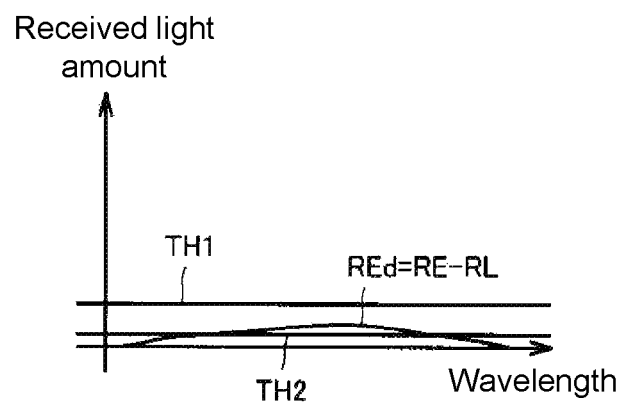
FIG. 11 is a diagram of correction made by subtracting the return light RL from a light receiving signal RE in a case where the optical fiber 52 falls out from the fiber connector 30.

FIG. 11 is a diagram of correction made by subtracting the return light RL from the light receiving signal RE in a case where the optical fiber 52 falls out from the fiber connector 30.

A corrected signal REd is obtained by subtracting the return light RL at the normal time, from which the influence of the exposure time is eliminated, from the light receiving signal RE in the case where the optical fiber 52 falls out from the fiber connector 30. As shown in FIG. 11, the corrected signal REd becomes smaller than the threshold value TH1 and becomes larger than the threshold value TH2.

Figure 12:
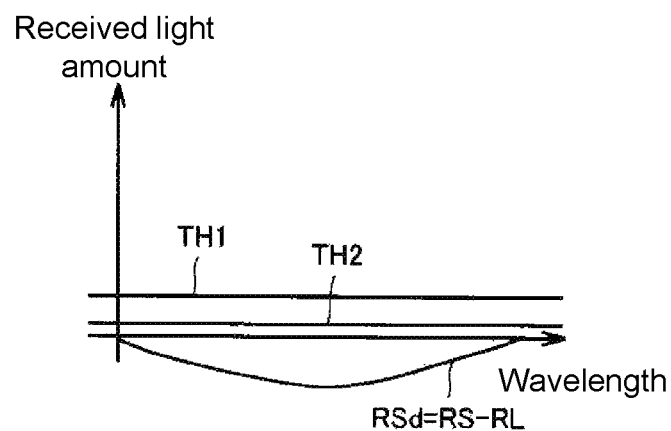
FIG. 12 is a diagram of correction made by subtracting the return light RL from a light receiving signal RS in a case where abnormality occurs in light projection of the light source device 10.

FIG. 12 is a diagram of correction made by subtracting the return light RL from the light receiving signal RS in a case where abnormality occurs in light projection of the light source device 10.

A corrected signal RSd is obtained by subtracting the return light RL at the normal time, from which the influence of the exposure time is eliminated, from the light receiving signal RS in the case where abnormality occurs in light projection of the light source device 10 and the light source device 10 is stopped. Since the light receiving signal RS is zero, the corrected signal RSd normally takes a negative value. When the light source device 10 is abnormal, the corrected signal RSd has a smaller value than the threshold values TH1 and TH2.

(Abnormality Detection at the Time of Measurement)

Next, a substantial method for detecting abnormality in the light projector of the confocal measurement device 50 based on received light waveform data will be described. The method for detecting abnormality includes, for example, a detection method based on sampling values and a detection method based on an area value of the light receiving signal.

Figure 13:
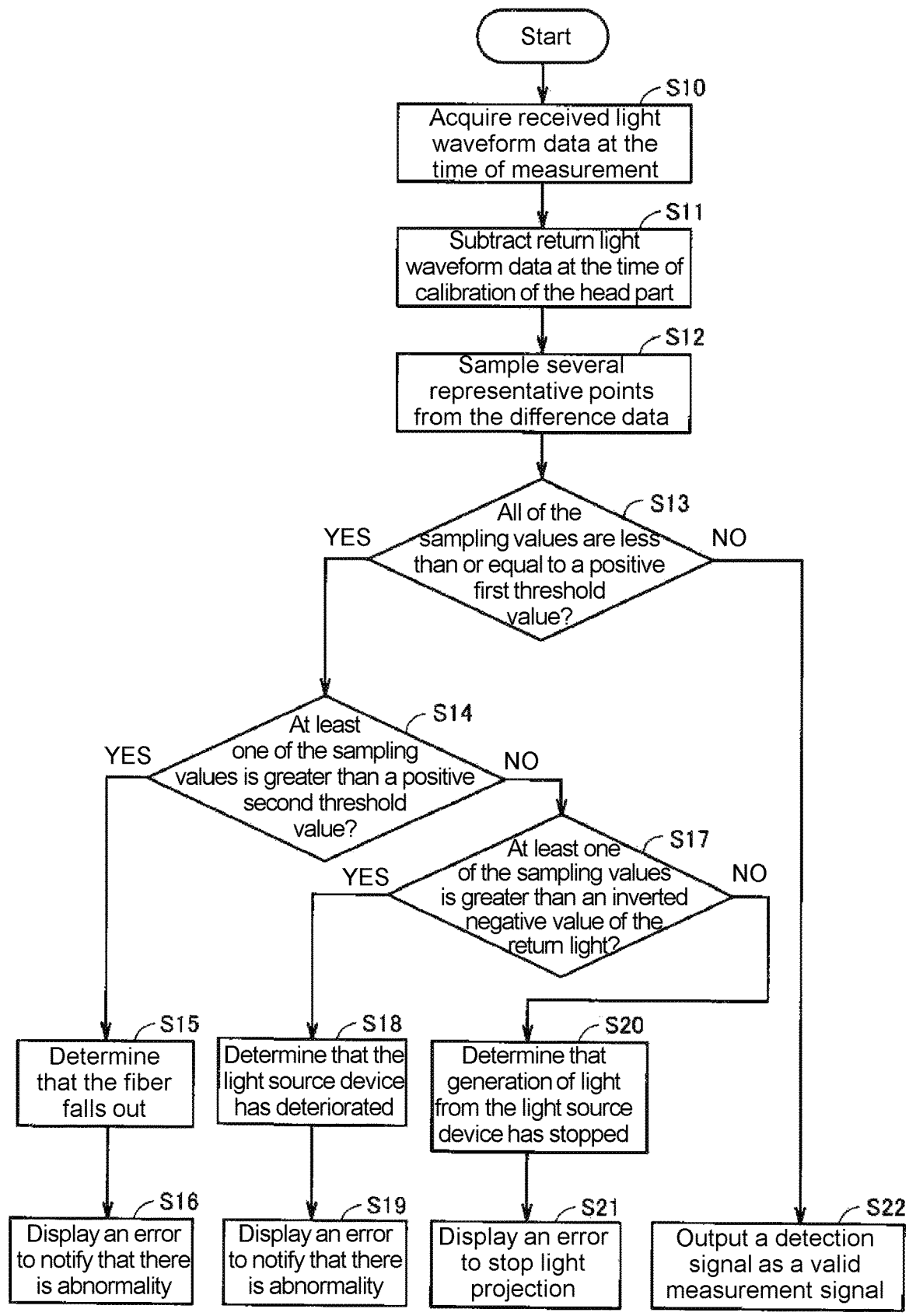
FIG. 13 is a flowchart showing a method for detecting abnormality in a light projector of the confocal measurement device 50 at the time of measurement by using sampling values.

FIG. 13 is a flowchart showing a method for detecting abnormality in the light projector of the confocal measurement device 50 at the time of measurement by using the sampling values.

Referring to FIG. 13, first, in step S10, received light waveform data at the time of measurement is acquired (see FIGS. 5, 7, and 9 and the corresponding descriptions). In step S11, return light waveform data at the time of calibration of the head part 51 is subtracted from the received light waveform data to calculate difference data (see FIGS. 10 to 12 and the corresponding descriptions). In step S12, several representative points are sampled from the difference data.

Figure 14:
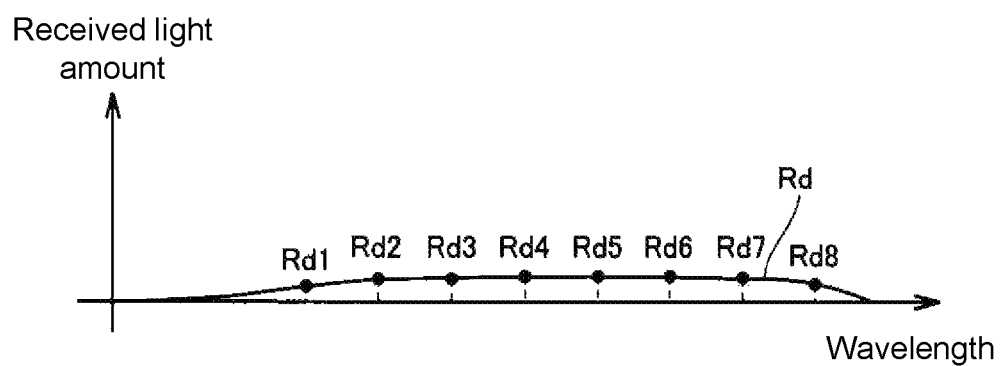
FIG. 14 is a diagram showing how several representative points are sampled from difference data.

FIG. 14 is a diagram showing how the several representative points are sampled from the difference data. As shown in FIG. 14, sampling points Rd1, Rd2, . . . , Rd8 (hereinafter also referred to as sampling points Rdk (k is a natural number)) are set with respect to difference data Rd.

Returning to FIG. 13, in step S13, it is determined whether sampling values at the sampling points Rdk are all less than or equal to a predetermined positive threshold value TH1. If the sampling values are all less than or equal to the positive threshold value TH1, it is determined in step S14 whether at least one of the sampling values is greater than a positive threshold value TH2.

If at least one of the sampling values is greater than the positive threshold value TH2, it is determined in step S15 that the optical fiber 52 falls out from the fiber connector 30. At this time, in step S16, an error is displayed on the monitor 54 to notify that there is abnormality of fiber fallout.

As illustrated in FIGS. 3 and 7, both the return light RL and the light receiving signal RE show substantially constant values regardless of the reflectance of the object under measurement TS. Therefore, referring to FIG. 11, the corrected signal REd=RE−RL also has a substantially constant value regardless of the reflectance of the object under measurement TS, and the variation range is extremely small. Accordingly, if the sampling values are all less than or equal to the predetermined positive threshold value TH1 and at least one of the sampling values is greater than the positive threshold value TH2, regardless of the presence of the object under measurement TS, it is determined that the optical fiber 52 has fallen out from the fiber connector 30.

On the other hand, in step S14, if the sampling values at the sampling points Rdk are all less than or equal to the positive threshold value TH2, in step S17, it is determined whether at least one of the sampling values is greater than an inverted negative value obtained by inverting the return light RL. If at least one of the sampling values is greater than the inverted negative value of the return light RL, it is determined in step S18 that the light source device 10 has deteriorated. At this time, in step S19, an error is displayed on the monitor 54 to notify that the light source device 10 has deteriorated.

In step S17, if all of the sampling values at the sampling points Rdk are substantially equal to the inverted negative value obtained by inverting the return light RL, in step S20, it is determined that generation of light from the light source device 10 has stopped. At this time, in step S21, an error is displayed on the monitor 54 and light projection of the light source device 10 is stopped.

If at least one of the sampling values is greater than the positive threshold value TH1 in step S13, a detection signal is output as a valid measurement signal in step S22. The measurement signal is output to the outside via the processing part 59.

Figure 15:
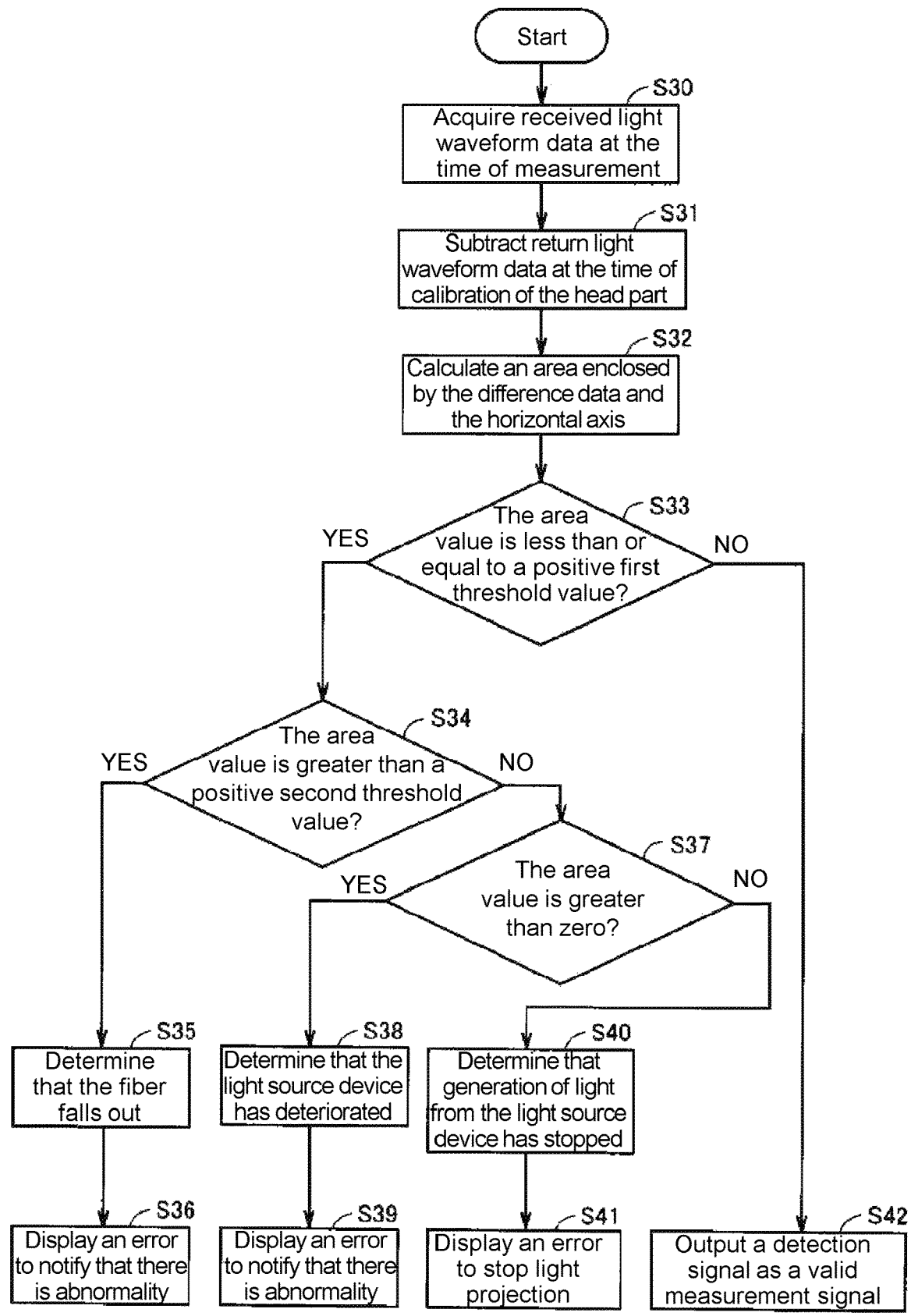
FIG. 15 is a flowchart showing a method for detecting abnormality in the light projector of the confocal measurement device 50 at the time of measurement by using an area value of the light receiving signal.

FIG. 15 is a flowchart showing a method for detecting abnormality in the light projector of the confocal measurement device 50 at the time of measurement by using an area value of the light receiving signal.

Referring to FIG. 15, first, in step S30, received light waveform data at the time of measurement is acquired (see FIGS. 5, 7, and 9 and the corresponding descriptions). In step S31, return light waveform data at the time of calibration of the head part 51 is subtracted from the received light waveform data to calculate difference data (see FIGS. 10 to 12 and the corresponding descriptions). In step S32, an area enclosed by the difference data and the horizontal axis (see FIG. 16) is calculated.

Figure 16:
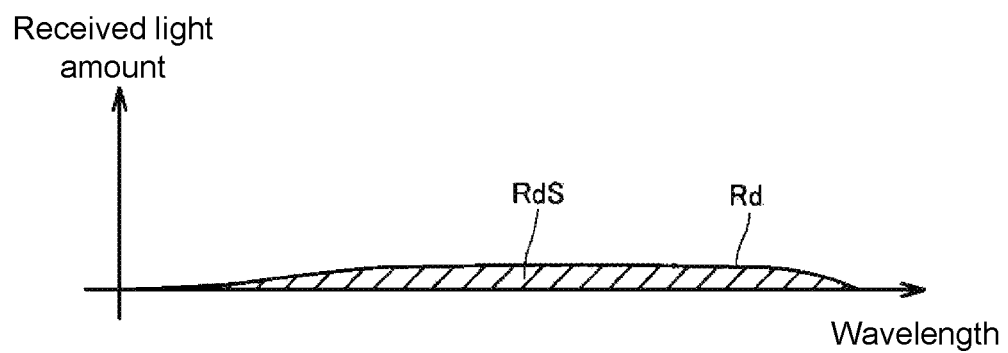
FIG. 16 is a diagram showing how to calculate an area enclosed by the difference data and the horizontal axis.

FIG. 16 is a diagram showing how to calculate the area enclosed by the difference data and the horizontal axis. As shown in FIG. 16, an area RdS enclosed by difference data Rd and the horizontal axis in the graph is calculated, where the vertical axis is the received light amount and the horizontal axis is the wavelength. Specifically, the area RdS is obtained by integrating the difference data Rd.

Returning to FIG. 15, in step S33, it is determined whether the area RdS enclosed by the difference data Rd and the horizontal axis is less than or equal to a predetermined positive threshold value TH1. If the area value is less than or equal to the positive threshold value TH1, it is determined in step S34 whether the area value is greater than a positive threshold value TH2. If the area value is greater than the positive threshold value TH2, it is determined in step S35 that the optical fiber 52 falls out from the fiber connector 30. At this time, in step S36, an error is displayed on the monitor 54 to notify that there is abnormality of fiber fallout.

As illustrated in FIG. 13, with reference to FIG. 11, the corrected signal REd=RE−RL has a substantially constant value regardless of the reflectance of the object under measurement TS, and the variation range is extremely small. Therefore, if the area value is less than or equal to the predetermined positive threshold value TH1 and is greater than the positive threshold value TH2, it is determined that the optical fiber 52 has fallen out from the fiber connector 30 regardless of the presence of the object under measurement TS.

On the other hand, if the area value is less than or equal to the positive threshold value TH2 in step S34, it is determined in step S37 whether the area value is greater than zero. If the area value is greater than zero, it is determined in step S38 that the light source device 10 has deteriorated. At this time, in step S39, an error is displayed on the monitor 54 to notify that the light source device 10 has deteriorated.

If the area value is substantially zero in step S37, it is determined in step S40 that generation of light from the light source device 10 has stopped. At this time, in step S41, an error is displayed on the monitor 54 and power supply to the light source device 10 is stopped.

If the area RdS enclosed by the difference data Rd and the horizontal axis is greater than the positive threshold value TH1 in step S33, a detection signal is output as a valid measurement signal in step S42. The measurement signal is output to the outside via the processing part 59.

(Abnormality Detection at Non-Measurement Time)

The above is the method for detecting abnormality in the light projector at the time of measurement of the object under measurement TS. In this case, in steps S11 and S31, the return light waveform data at the time of calibration of the head part 51 is acquired. A specific method for detecting abnormality in the light projector at the time of acquisition of the return light waveform data (at non-measurement time) will be described below.

Figure 17:
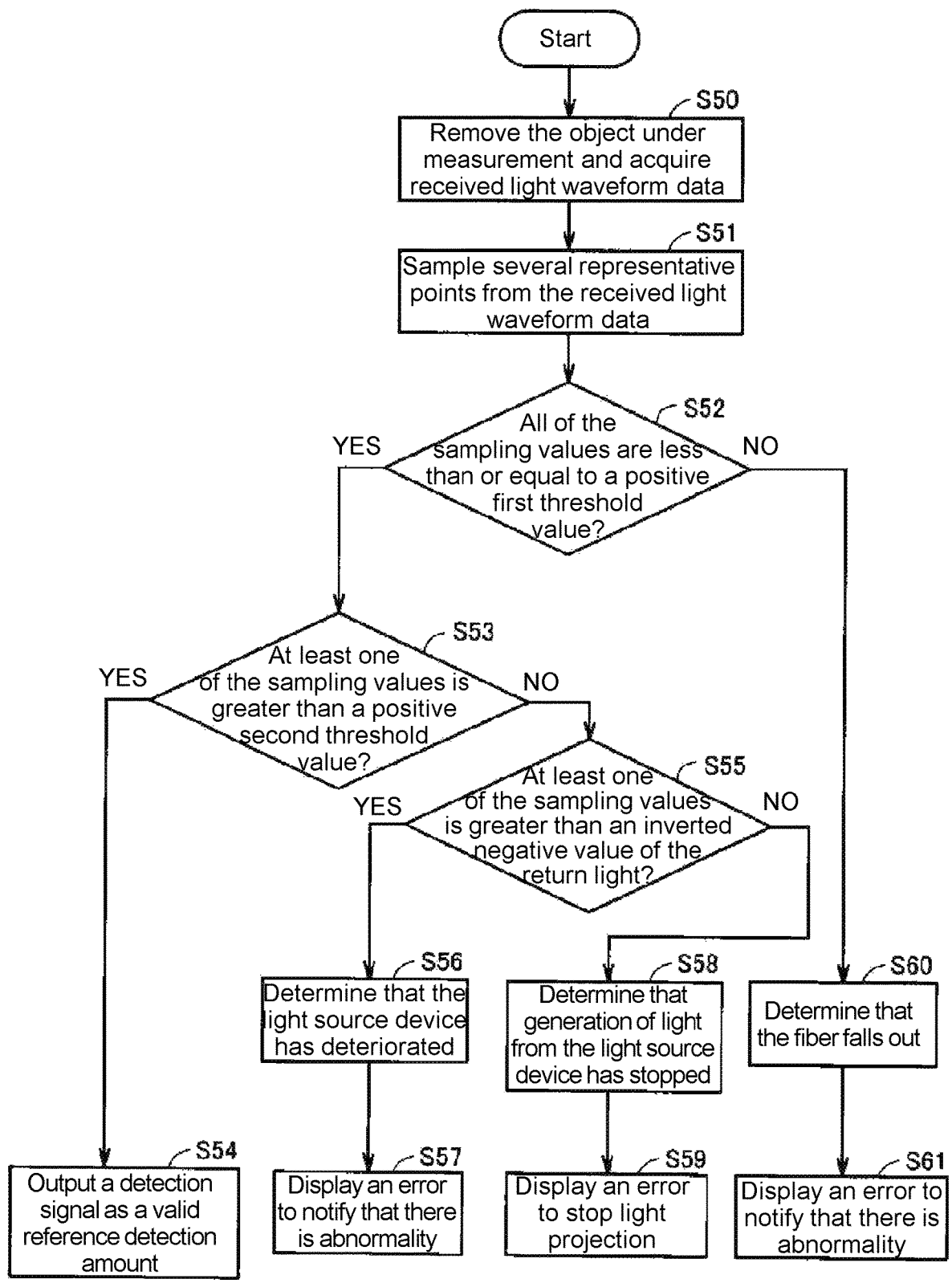
FIG. 17 is a flowchart showing a method for detecting abnormality in the light projector of the confocal measurement device 50 at non-measurement time by using sampling threshold values.

FIG. 17 is a flowchart showing a method for detecting abnormality in the light projector of the confocal measurement device 50 at non-measurement time by using sampling threshold values.

Referring to FIG. 17, first, in step S50, the object under measurement TS is removed and received light waveform data is acquired (see FIG. 3, 7, or 9 and the corresponding descriptions). In step S51, several representative points are sampled from the received light waveform data.

In step S52, it is determined whether all of sampling values are less than or equal to a predetermined positive threshold value TH1. If all of the sampling values are less than or equal to the positive threshold value TH1, it is determined in step S53 whether at least one of the sampling values is greater than a positive threshold value TH2. If at least one of the sampling values is greater than the positive threshold value TH2, a detection signal is output as a valid reference detection amount of the return light RL in step S54 (see FIG. 3). The waveform data of the return light RL is recorded in the processing part 59 and is used for the next measurement.

On the other hand, if all of the sampling values are less than or equal to the positive threshold value TH2 in step S53, it is determined in step S55 whether at least one of the sampling values is greater than an inverted negative value obtained by inverting the return light RL. If at least one of the sampling values is greater than the inverted negative value of the return light RL, it is determined in step S56 that the light source device 10 has deteriorated. At this time, in step S57, an error is displayed on the monitor 54 to notify that the light source device 10 has deteriorated.

In step S55, if all of the sampling values at the sampling points Rdk are substantially equal to the inverted negative value obtained by inverting the return light RL, in step S58, it is determined that generation of light from the light source device 10 has stopped (see FIG. 9). At this time, in step S59, an error is displayed on the monitor 54 and light projection of the light source device 10 is stopped.

If at least one of the sampling values is greater than the positive threshold value TH1 in step S52, it is determined in step S60 that the optical fiber 52 has fallen out from the fiber connector 30 (see FIG. 7). At this time, in step S61, an error is displayed on the monitor 54 to notify that there is abnormality of fiber fallout.

Figure 18:
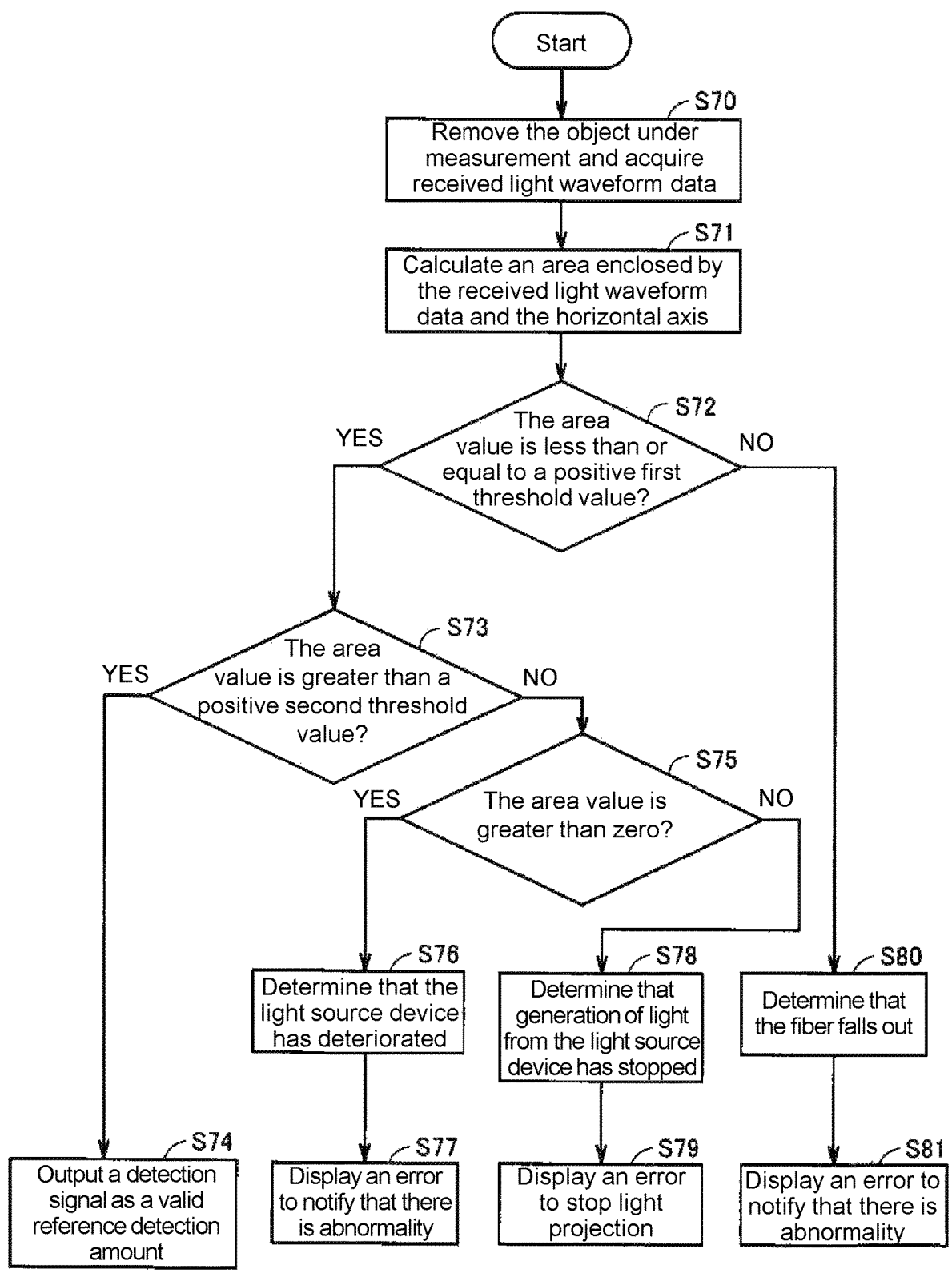
FIG. 18 is a flowchart showing a method for detecting abnormality in the light projector of the confocal measurement device 50 at non-measurement time by using an area value of the light receiving signal.

FIG. 18 is a flowchart showing a method for detecting abnormality in the light projector of the confocal measurement device 50 at non-measurement time by using an area value of the light receiving signal.

Referring to FIG. 18, first, in step S70, the object under measurement TS is removed and received light waveform data is acquired (see FIG. 3, 7 or 9 and the corresponding descriptions). In step S71, an area enclosed by the received light waveform data and the horizontal axis (see FIG. 16) is calculated.

In step S72, it is determined whether the area enclosed by the received light waveform data and the horizontal axis is less than or equal to a predetermined positive threshold value TH1. If the area value is less than or equal to the positive threshold value TH1, it is determined in step S73 whether the area value is greater than a positive threshold value TH2. If the area value is greater than the positive threshold value TH2, a detection signal is output as a valid reference detection amount of the return light RL in step S74 (see FIG. 3). The waveform data of the return light RL is recorded in the processing part 59 and is used for the next measurement.

On the other hand, if the area value is less than or equal to the positive threshold value TH2 in step S73, it is determined in step S75 whether the area value is greater than zero. If the area value is greater than zero, it is determined in step S76 that the light source device 10 has deteriorated. At this time, in step S77, an error is displayed on the monitor 54 to notify that the light source device 10 has deteriorated.

If the area value is substantially zero in step S75, it is determined in step S78 that generation of light from the light source device 10 has stopped (see FIG. 9). At this time, in step S79, an error is displayed on the monitor 54 and light projection of the light source device 10 is stopped.

If the area enclosed by the received light waveforms data and the horizontal axis is greater than the positive threshold value TH1 in step S72, it is determined in step S80 that the optical fiber 52 has fallen out from the fiber connector 30 (see FIG. 7). At this time, in step S81, for example, an error is displayed on the monitor 54 to notify that there is abnormality of fiber fallout.

As described above, according to the embodiments of the disclosure, the received light data collected on the imaging element is monitored to detect junction abnormality of the branch part. First, the return light data acquired at the time of calibration of the head part is recorded as data at the normal time. Next, the received light data at the time of measurement is acquired, and the return light data at the normal time, from which the influence of the exposure time is eliminated, is subtracted from the received light data. With respect to the difference data, an abnormal state is determined based on the sampling values or the area value.

When it is determined that generation of light from the light source device is stopped, the processing part stops light projection of the light source device. In addition, if it is determined that there is abnormality at the junction between the optical fiber and the branch part or that the light source device has deteriorated, the processing part notifies the abnormality through a notification part such as a monitor.

As described above, it is possible to detect junction abnormality and light source abnormality without providing an additional detection mechanism such as a sensor.

It should be considered that the embodiments disclosed herein are illustrative and are not restrictive in any sense. The scope of the disclosure is defined by the claims attached below rather than by the embodiments described above. It is intended that the disclosure cover equivalents to the claims and all modifications made within the scope.

What is claimed is:

1. An optical sensor for measuring a distance to an object or a displacement of the object based on a reflected light from the object, the optical sensor comprising:
   a light source device that generates light to be irradiated to the object;
   a light receiving part that receives the reflected light from the object;

a branch part that fuses a first optical fiber optically coupled to the light source device and a second optical fiber optically coupled to the light receiving part to join with one end of a third optical fiber which faces the object; and a processing part that determines whether junction abnormality occurs at a junction between the third optical fiber and the branch part based on whether an increment in a received light amount of the reflected light received by the light receiving part with respect to a reference detection amount is within a predetermined range, wherein a received light amount of the reflected light received by the light receiving part in a state of no reflection from the other end of the third optical fiber is set as the reference detection amount.

2. The optical sensor according to claim 1, wherein the light receiving part is configured to output a wavelength characteristic of incident light intensity, and the processing part determines whether the increment is within the predetermined range based on a difference wavelength characteristic corresponding to a difference between a reference wavelength characteristic corresponding to the reference detection amount and the wavelength characteristic from the light receiving part.

3. The optical sensor according to claim 2, wherein when all of intensities at a plurality of wavelengths indicated by the difference wavelength characteristic are less than or equal to a predetermined positive first threshold value and at least one of the intensities is greater than a predetermined positive second threshold value smaller than the positive first threshold value, the processing part determines that abnormality occurs at the junction between the third optical fiber and the branch part.

4. The optical sensor according to claim 3, wherein when all of the intensities at the plurality of wavelengths indicated by the difference wavelength characteristic are less than or equal to the positive second threshold value, the processing part determines that abnormality occurs in generation of light from the light source device.

5. The optical sensor according to claim 4, wherein when all of the intensities at the plurality of wavelengths indicated by the difference wavelength characteristic are less than or equal to the positive second threshold value and at least one of the intensities is greater than an inverted negative value of the reference detection amount, the processing part determines that the light source device has deteriorated, and when all of the intensities at the plurality of wavelengths indicated by the difference wavelength characteristic are substantially equal to the inverted negative value of the reference detection amount, the processing part determines that generation of light from the light source device has stopped.

6. The optical sensor according to claim 5, wherein determining that generation of light from the light source device has stopped, the processing part stops light projection of the light source device.

7. The optical sensor according to claim 5, further comprising a notification part, wherein when determining that abnormality occurs at the junction between the third optical fiber and the branch part or when determining that the light source device has deteriorated, the processing part notifies the abnormality through the notification part.

8. The optical sensor according to claim 4, wherein when no abnormality occurs at the junction between the third optical fiber and the branch part and no abnormality occurs in generation of light from the light source device, the processing part outputs a detection signal from the light receiving part as a valid measurement signal.

9. The optical sensor according to claim 2, wherein the processing part calculates an area value by integrating the intensities of the wavelengths indicated by the difference wavelength characteristic, and when the calculated area value is less than or equal to a predetermined positive first threshold value and is greater than a predetermined positive second threshold value smaller than the positive first threshold value, the processing part determines that abnormality occurs at the junction between the third optical fiber and the branch part.

10. The optical sensor according to claim 9, wherein when the area value is less than or equal to the positive second threshold value, the processing part determines that abnormality occurs in generation of light from the light source device.

11. The optical sensor according to claim 10, wherein when the area value is less than or equal to the positive second threshold value and is greater than zero, the processing part determines that the light source device has deteriorated, and when the area value is substantially zero, the processing part determines that generation of light from the light source device has stopped.

12. The optical sensor according to claim 11, wherein when determining that generation of light from the light source device has stopped, the processing part stops light projection of the light source device.

13. The optical sensor according to claim 11, further comprising a notification part, wherein when determining that abnormality occurs at the junction between the third optical fiber and the branch part or when determining that the light source device has deteriorated, the processing part notifies the abnormality through the notification part.

14. The optical sensor according to claim 10, wherein when no abnormality occurs at the junction between the third optical fiber and the branch part and no abnormality occurs in generation of light from the light source device, the processing part outputs a detection signal from the light receiving part as a valid measurement signal.

15. An abnormality detection method for an optical sensor that measures a distance to an object or a displacement of the object based on a reflected light from the object, the abnormality detection method comprising:

irradiating light generated by a light source device to the object and acquiring by a processor a received light amount of the reflected light received by a light receiving part as a reference detection amount, wherein a first optical fiber optically coupled to the light source device and a second optical fiber optically coupled to the light receiving part are fused at a branch part to join with one end of a third optical fiber which faces the object, wherein the reference detection amount is a received light amount detected by the light receiving part in a state of no reflection from the other end of the third optical fiber;

irradiating light generated by the light source device to the object and acquiring by a processor a received light amount of the reflected light received by the light receiving part as an evaluation object detection amount; and determining by a processor whether junction abnormality at a junction between the third optical fiber and the branch part based on whether an increment in the evaluation object detection amount with respect to the reference detection amount is within a predetermined range.

* * * * *